(12) United States Patent
Webb

(10) Patent No.: US 8,403,071 B1
(45) Date of Patent: Mar. 26, 2013

(54) STATION HAVING PROTECTIVE WALL AND ISOLATED CHAMBER

(75) Inventor: Ronald Michael Webb, Las Vegas, NV (US)

(73) Assignee: U-Fuel, Inc. NV, Las Vegas, NV (US)

( * ) Notice: Subject to any disclaimer, the term of this patent is extended or adjusted under 35 U.S.C. 154(b) by 0 days.

(21) Appl. No.: 13/422,408

(22) Filed: Mar. 16, 2012

(51) Int. Cl.
*A62C 25/00* (2006.01)
*A62C 27/00* (2006.01)
*A62C 3/06* (2006.01)
*B65B 37/00* (2006.01)
*B65B 1/04* (2006.01)

(52) U.S. Cl. ............... 169/66; 169/51; 169/48; 141/231; 141/18

(58) Field of Classification Search ............ 169/45, 169/51, 22, 66, 68, 52, 48–50; 141/82, 231, 141/94, 18; 222/54, 131, 129, 108; 220/565
See application file for complete search history.

(56) References Cited

U.S. PATENT DOCUMENTS

| | | | | |
|---|---|---|---|---|
| 1,989,940 A | * | 2/1935 | McGaughan et al. | 280/80.1 |
| 2,674,775 A | * | 4/1954 | Willson | 264/87 |
| 3,066,770 A | * | 12/1962 | Millard et al. | 52/220.7 |
| 3,773,604 A | * | 11/1973 | Desai et al. | 220/560.05 |
| 4,122,203 A | * | 10/1978 | Stahl | 428/318.4 |
| 4,988,020 A | * | 1/1991 | Webb | 222/608 |
| 5,081,761 A | * | 1/1992 | Rinehart et al. | 29/428 |
| 5,305,926 A | | 4/1994 | Webb | |
| 5,562,162 A | * | 10/1996 | Webb | 169/45 |
| 5,975,371 A | * | 11/1999 | Webb | 222/173 |
| 6,182,710 B1 | | 2/2001 | Webb | |
| 7,328,728 B1 | * | 2/2008 | Vilar | 141/231 |

OTHER PUBLICATIONS

"Gas Station Fire Safety a Cause for Concern", Nov. 3, 2011, The Kurdish Globe.*

* cited by examiner

*Primary Examiner* — Len Tran
*Assistant Examiner* — Justin Jonaitis
(74) *Attorney, Agent, or Firm* — Anthony J Bourget

(57) ABSTRACT

An aboveground fueling facility for storing and dispensing a combustible fluid such as gasoline includes a double-wall storage tank provided in a fuel storage section where the tank is constructed and arranged to store the combustible fluid in a fire resistant tank and box. The facility further includes a dispenser section for dispensing the fuel and an isolating wall which separates the fuel storage section from the dispenser section. The isolating wall is preferably a fire wall and in part defines a fuel supply chamber. An access door provides access for a person to enter or exit the fuel supply chamber. A user may obtain self-service of fuel at the dispenser section which may also be secured by a door. Fire resistant panels are also used as the exterior box structure for the facility and also provide a display or advertising function.

29 Claims, 9 Drawing Sheets

STATION HAVING PROTECTIVE WALL AND ISOLATED CHAMBER

BACKGROUND OF THE INVENTION

1. Field of the Invention

The present invention relates to an aboveground fueling or service facility or station that can be conveniently and efficiently deployed in a desired location and that provides for safety in the storage and dispensing of flammable and combustible fuel.

2. Background Information

Nearly all modern airports have facilities of some type for refueling. The most prevalent type of aircraft refueling facilities include a below-ground storage tank or an above ground pumping module or fueling location, or both, which is operated by an attendant much in the manner of commercial stations for automobiles. There are a variety of types of motor fuel dispensing systems and facilities that include below-ground storage tanks and a number that also use above-ground storage tanks.

Above-ground fueling stations have become increasingly popular and commercially available. For example, a known above-ground refueling station may include a pair of tanks which are manifolded together and are mounted on a hard surface by a skid. A remotely positioned, electrically powered dispensing unit is provided to dispense the fuel from the above-ground refueling station and an attendant is on duty to monitor the refueling transaction and to prevent leaks or spills. Other examples of innovation in the above-ground fueling stations art are evidenced by the inventor's disclosures in U.S. Pat. Nos. 4,988,020; 5,033,637; 5,305,926; 5,562,162; 6,182,710; 6,216,790; 7,296,601, which are hereby incorporated by reference as if fully set forth herein.

While the prior art has provided examples of aboveground fuel tanks, and specifically aboveground fuel tanks fluidly connected to fueling locations, there is always room for improvement.

SUMMARY OF THE INVENTION

Although aboveground fuel tanks, specifically aboveground fuel tanks connected to fueling locations are known, the inventor has realized deficiencies with such devices and has developed improvements thereon. For example, as the world becomes more industrialized and demand for above-ground fueling stations increases, the inventor has realized a growing need to produce above-ground fueling stations. Particularly useful are unattended (or minimally attended) fueling stations where users may pump fuel in a self-serve manner. A vending system allows the user to pay for the fuel at the pump location. In order to accommodate the most efficient use of resources, there is a desire to configure the vending system and pump units at a location that accommodates ease of use. The ability to make payment at the pump location via credit or debit card is crucial for operation of an efficient facility or station. Moreover, orienting the vending and pumping unit in close proximity to the fuel storage tank is desired for several reasons. One reason is that having the vending/pumping section in close proximity to the storage tank allows for a small-scale facility in terms of space allocation. Having a close proximity also reduces the amount of energy required to pump the fuel from the tank to the nozzle. Close proximity of the vending/pumping section and storage tank also allows for security in that the components may be housed in the same protective container, and especially may include fire resistant panels.

One potential drawback of orienting the vending/pumping section in close proximity to the storage tank was the potential for leaking of fumes or fuel in an unsafe manner. Introducing fumes or fuel near a vending or pumping operation, with the presence of electricity or sparks (or even persons that might be smoking), is a potential safety issue. Accordingly, the inventor recognizes the safety improvement of placing a fire wall between the vending/pumping section and the tank; and also providing an isolated fuel supply chamber which is positioned between the vending/pumping section and the tank. The supply location has greatest potential for spilling and fumes, and especially when filling the tank, given the fluid dynamics and change in the environment in terms of volumes, pressures, static, and other conditions that might induce a fire and/or explosion. A fuel supply chamber that is isolated from both the pumping/vending section and the tank storage section enhances the safety of the structure In accordance with an aspect of the invention, an improved aboveground facility and system for storing combustible fluid, such as gasoline, comprises a storage tank that is constructed and arranged to store combustible fluid, a box structure substantially surrounding the storage tank, a fueling station with a pump or pumps fluidly connected to the storage tank, and an optional canopy extending from the box structure over at least the pumps, where the canopy is at least partially supported by a ceiling of the box structure. The tank is a double-wall storage tank and surrounded by fire rated panels. Importantly the facility includes an internal fire wall to isolate a dispenser section from the fuel storage section. The fire wall defines a fuel supply chamber which includes piping to supply fuel to the tank.

An object of the invention is to provide a refueling facility that has improved safety qualities, including a fire wall to isolate a dispensing area from other areas of the facility.

An object of the invention is to provide a refueling facility which includes a fire rated double walled tank surrounded by fire rated panels.

An object of the invention is to provide a fuel supply chamber isolated from a dispensing area and where the chamber may be entered by a person for inspection or operations.

A further object of the invention is to provide an above-ground refueling facility which includes a double walled fuel tank surrounded by fire rated panels that also display communication media.

A further object of the invention is to provide a refueling facility which provides easy and convenient access to a fueling station, yet allows the fueling station to be protected at times of non-use.

The above summary of the present invention is not intended to describe each illustrated embodiment, aspect, or every implementation of the present invention. The figures and detailed description and claims that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which.

Figure 1:
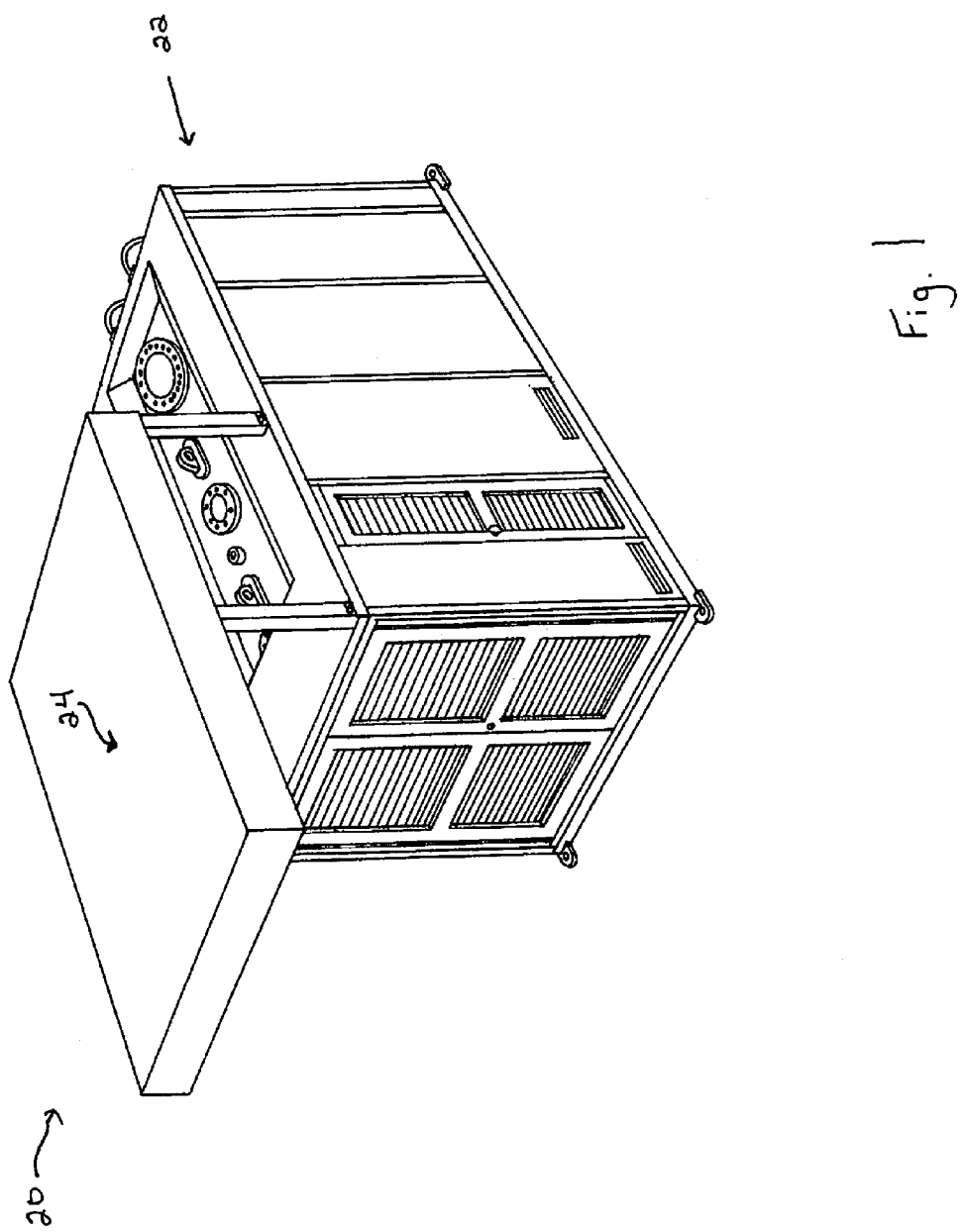
FIG. 1 is a perspective view of a facility in accordance with an aspect of the present invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Figure 2:
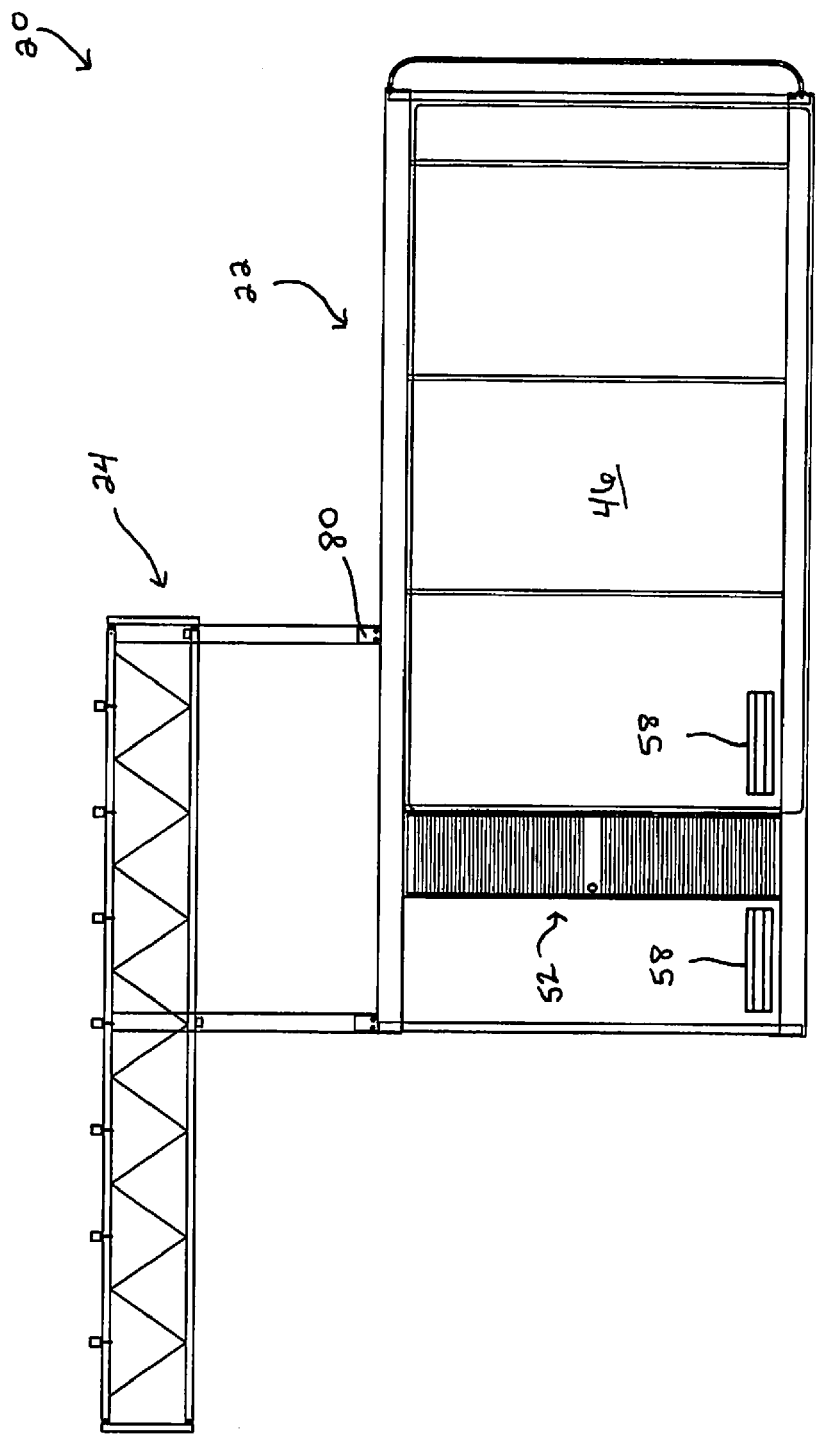
FIG. 2 is a side view of a facility in accordance with an aspect of the present invention.
Figure 3:
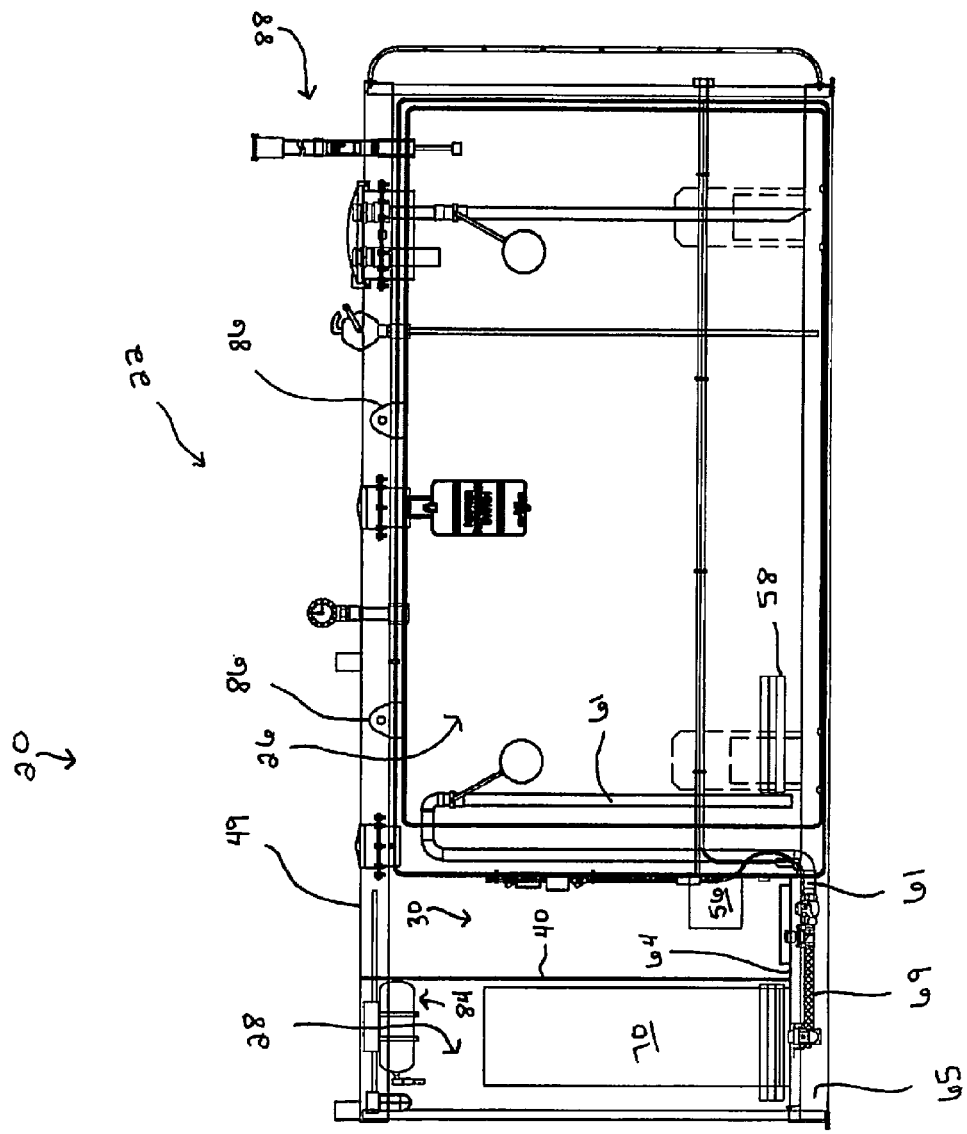
FIG. 3 is a side diagrammatical view of the facility in accordance with an aspect of the invention with portions removed for clarity.
Figure 4:
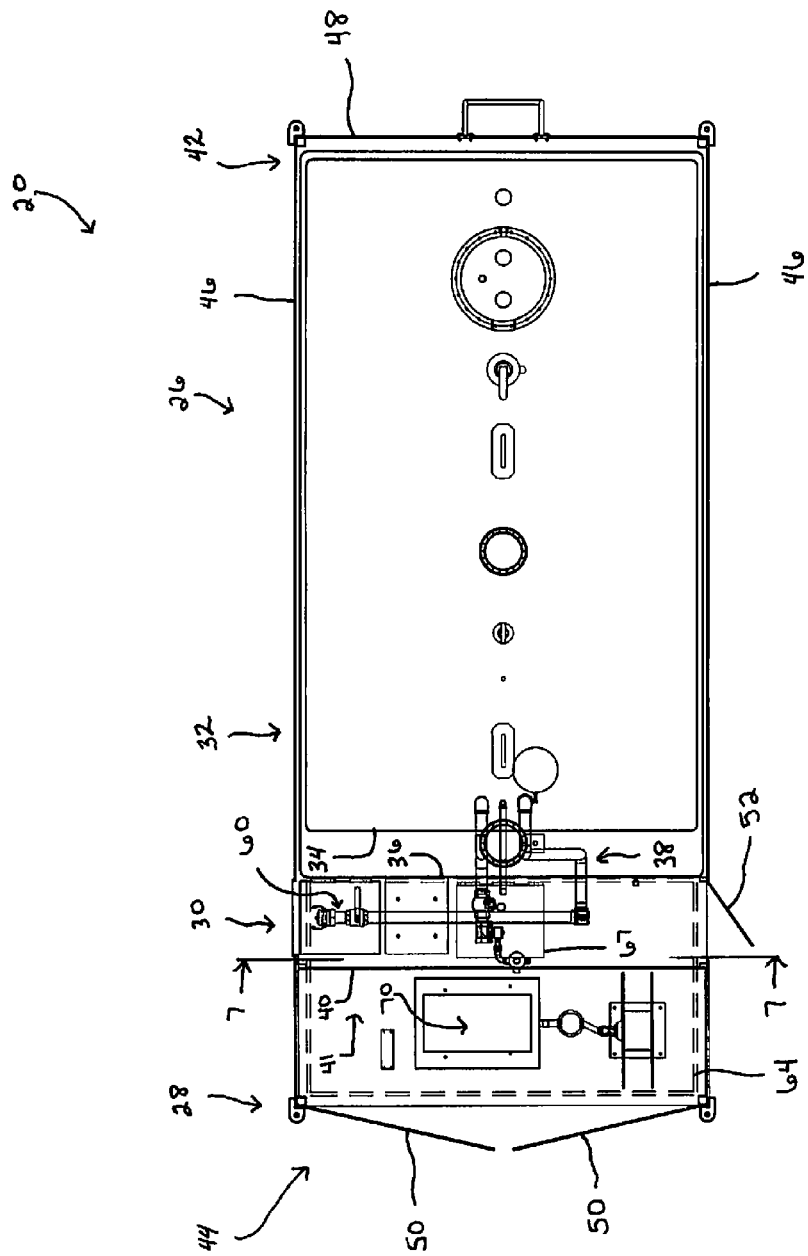
FIG. 4 is a top diagrammatical view of the facility shown in FIG. 3 with portions removed for clarity.

Referring to FIGS. 1-10, aspects of a fueling facility 20 are shown. As shown in FIG. 1 and FIG. 2, facility 20 includes a box-like structure 22 and an optional canopy 24. As shown in FIG. 3 and FIG. 4, facility 20 includes a fuel storage section 26, dispenser section 28 and fuel supply chamber 30. Preferably storage section 26, dispenser section 28 and supply chamber 30 are all positioned within box 22. Inside fuel storage section 26 is a tank 32. Preferably tank 32 is a double-walled tank that is fire resistant. Preferably tank 32 includes inner tank wall 34 and outer tank wall 36. An interstitial space 38 is present between tank wall 34 and tank wall 36.

A fire wall 40 separates dispenser section 28 from fuel storage section 26. Preferably fire wall 40 in part defines fuel supply chamber 30. Fire wall 40 preferably spans from side panel 46 to an opposite side panel 46 as shown in FIG. 4. As shown in FIG. 3, wall 40 also spans from a top panel 49 to deck 64. In such manner fuel supply chamber 30 is isolated from dispenser section 28.

As used herein "fire wall" or "fire rated" is defined as a panel or wall or material that meets certain fire resistance standards or requirements, particularly, "fire rated" or a "fire wall" is one that complies with UL 723 (Underwriters Laboratory standard UL 723), ANSI 255 (American National Standards Institute standard No. 255) and/or NFPA No. 255 (National Fire Protection Association standard No. 255), and/or UBC No. 8-1. In one aspect, fire wall 40, side panels 46, and end panel 48 are made of the same or similar material. Panels 46, 48 are preferably fire rated panels.

Figure 5:
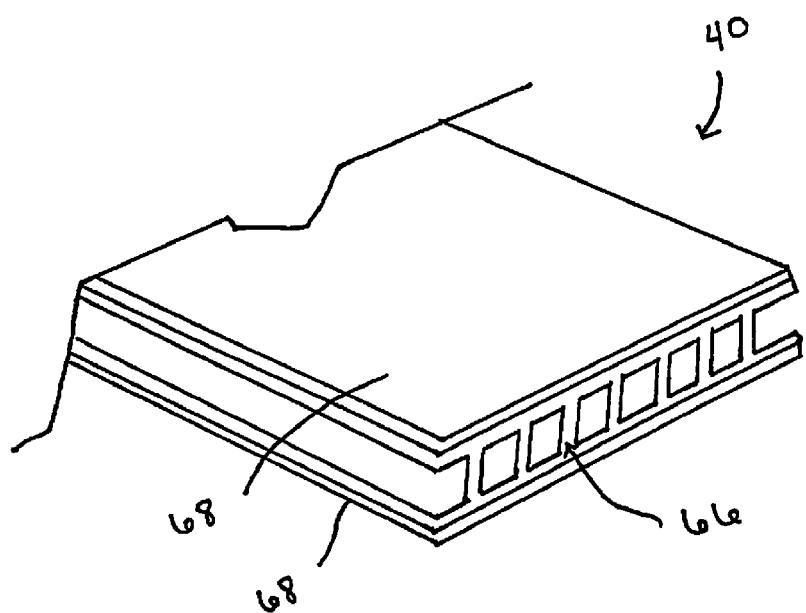
FIG. 5 is a perspective view of a panel feature of the facility in accordance with an aspect of the invention.

In reference to FIG. 5, an example of a fire wall 40 or panels 46, 48 preferably comprise a plastic core positioned between metal sides. For instance, the core 66 may be a copolymer plastic core of a "fluted" variety generally as shown in FIG. 5. Core 66 may also have a corrugated structure. A metal layer 68, such as aluminum or other metal, may be positioned on either side of core 66. Preferably layer 68 is a laminated aluminum overlay on both sides of core 66. Preferably layer 68 is also finished with a smooth and glossy baked enamel. In this way panels 46, 48 may receive graphic elements to produce signs or other displays. Panels 46, 48 may be painted or printed with graphic designs as desired. Wall 40 and panels 46, 48 may come in various thicknesses and in sheets of various lengths which are cut to desired dimensions.

Figure 6:
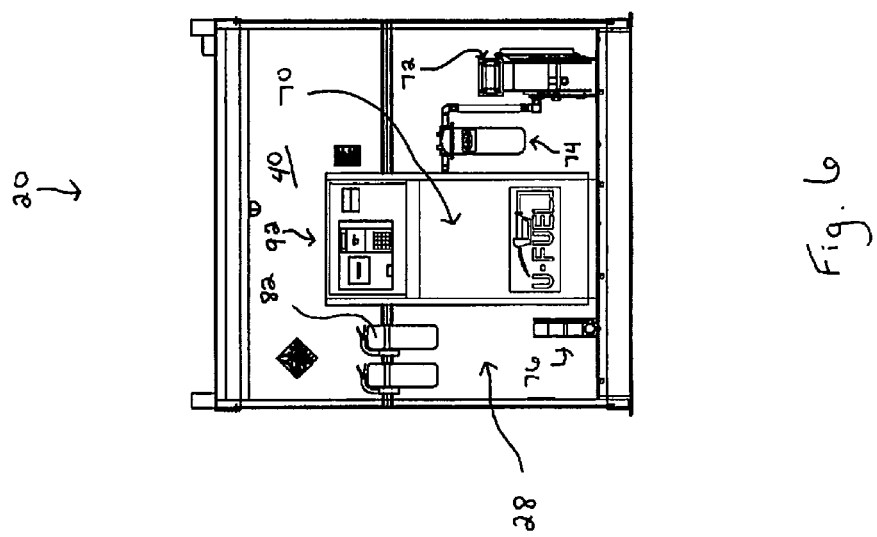
FIG. 6 is a front view of the facility shown in FIG. 3 with portions removed for clarity.

Within dispenser section 28 is a fuel dispenser 70 which contains a pump as generally shown in FIG. 6. Preferably dispenser 70 is of a vending variety in that a card reader 92 is included so that a user may facilitate payment for the fuel by using a credit card, debit card, gift card or the like. Thus, facility 20 may be unattended. Alternative vending payment arrangements may also be used whether developed now or in the future. Dispenser section 28 also preferably includes a hose reel 72 around which a hose may be wound. Such hose typically includes a nozzle for insertion into the fuel tank receptor of a vehicle or airplane or other machine or container to be fueled. A filter 74 and associated piping for a fueling operation are also preferably included. Dispenser section 28 and dispenser/pump 70 are powered by electricity. A grounding reel 76 is provided for grounding connection of an aircraft or other equipment. An automatic fire suppression system 84 is positioned within section 28. Fire extinguishers 82 are also provided. Lift plates 86 (FIG. 3) are provided to assist in transport of portable facility 20. Other general safety items 88, such as pressure/vacuum working vent, audible overfill alarm, top fill with spill containment, mechanical level gauge, overfill shutoff valves, internal ignition suppression system, interstitial emergency vent, explosion proof conduit, interstitial leak gauge, fusible link fire valve, explosion proof solenoid valve, fusible link shear valve, and other items may be provided.

Facility 20 is an aboveground fueling facility which provides a compact efficient solution for fueling vehicles, airplanes, boats and the like. Placing a fueling tank 32 in close proximity to an electrical source should be done with caution. Care must be used to avoid creation of a flame, spark, static electricity or other combustible environment in the presence of fuel or fuel vapors. Accordingly, aspects of the present invention are designed to minimize such hazards. Particularly, fire wall 40 provides a barrier to eliminate or reduce the potential for such hazard. Flame resistant or fire rated fire wall 40 provides a measure of safety to assist in isolating the fuel supply chamber 30 from the spread of potential fire (whether from dispenser section 28 to fuel supply chamber 30, or vice versa). As such, the spread of fire to or from fuel storage section 26 is also prevented or reduced.

The presence of fuel supply chamber 30 provides enhanced safety due to improved isolation of fumes and fuel. Particularly, when a fueling or refill hose 59 is connected or disconnected to fuel supply piping 60, by use of a bottom fill nozzle 63 at the end of piping 60, spills of fuel or release of fuel vapors may be expected. Spill container 62 is provided to contain such spills. Even so, such spill present a hazard where fumes may escape, thus a panel or isolation wall 41 is desired. Wall 41 is configured to limit or prevent vapors or fuels from traveling to dispenser section 28. Preferably dispenser section 28 is sealed from chamber 30 as shown in FIG. 3 and FIG. 4. Preferably wall 41 is a fire wall 40. Further, vapor vent 58 is utilized to allow vapors within panels 46 to escape so that dangerous build-up of vapors is reduced or eliminated.

Preferably dispenser section 28 includes a dispenser area 29 bound on at least three sides by fire rated panels. Particularly, fire wall 40 defines a back wall of area 29 (see FIG. 10), while fire rated side panels 46, 46 define side walls of area 29. In this way dispenser 70 which is positioned within area 29 may also be bound on at least three sides by fire rated panels. If a fire situation would arise within area 29, doors 50 may also be closed to further assist in containing or extinguishing the fire. Since fire suppression system 84 is also positioned within area 29, the suppression fluid released by system 84 is also contained so that a more concentrated extinguishing action is realized due to area 29 being bounded by panels. Fire suppression system 84 therefore more efficiently operates to extinguish a fire due to the cabinet-like structure of panels bounding area 29.

Chamber 30, which is defined in part by fire wall 40 and tank 32, provides space between dispenser section 28 and fuel storage section 26. Such space provides a set-back with further separates the stored fuel from potential fire danger at dispenser section 28. Positioning fueling access port 54 so as to avoid communication with dispenser section 28 provides for further safety enhancement. Fuel supply piping 60 is therefore isolated from section 28. Preferably bottom fill door 56 is used to cover access port 54. Door 56 may be opened to allow a hose and nozzle to connect to piping 60. Preferably chamber 30 includes access door 52 which opens to allow a person to enter and exit chamber 30 as needed or desired. Door 52 may be locked for security. An additional optional fire wall, similar or identical to wall 40 may also be positioned within chamber 30 between wall 40 and tank 32. In such configuration chamber 30 may be isolated from both dispenser section 28 and fuel storage section 26. A chamber 30 having such double fire wall may provide further safety in isolating or containing fires that might occur.

While other orientations may be used, preferably fuel storage section 26 is positioned at a first end 42 of facility 20 and dispenser section 28 is positioned at a second end 44, opposite first end 42, as shown in FIG. 4. In this manner fire wall 40 may operate to isolate section 26 from section 28. Preferably supply chamber 30 is positioned between dispenser section 28 and fuel storage section 26.

A door 50 and preferably a pair of doors 50, 50 are provided at dispenser section 28. Preferably doors 50 are security doors and may lock to secure section 28. Preferably door 50 is connected to panel 46 with a double hinge so that door 50 may open and fold against panel 46 so that door 50 may be folded into a compact position during operational use of facility 20. Alternative doors, such as a roll-up door or other doors may also be used.

Figure 7:
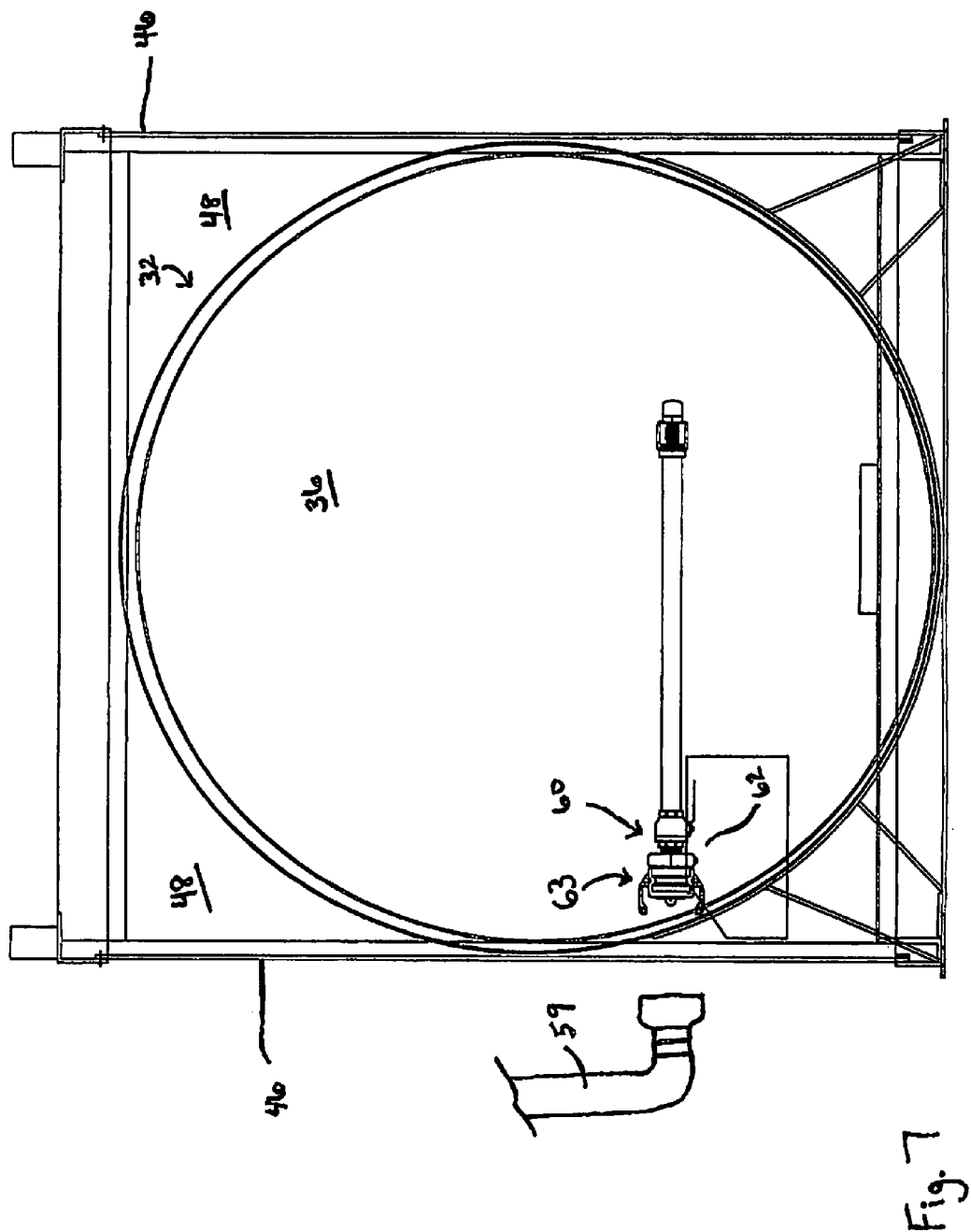
FIG. 7 is a section view taken along line 7-7 of FIG. 4 with access door removed for clarity.

Referring to FIG. 3 and FIG. 4, a deck 64 supports fire wall 40. Dispenser 70 is also supported by deck 64. A containment pan 65 is positioned below deck 64, or more preferably, deck 64 and containment pan 65 are integrally connected. An inspection hatch door 67 is provided in deck 64 to allow for access to or viewing of hoses, tubes, valves or other components that lay underneath or within deck 64. A fire resistant flexible hose connects dispenser 70 to fuel exit piping 61. It may be appreciated that exit piping 61 draws fuel from within tank 32. Piping 61 (and fuel from tank 32) exits inner tank wall 34, passes through interstitial space 38, runs through outer tank wall 36 and leads underneath deck 64 to dispenser/pump 70. FIG. 7 is a section view taken along line 7-7 of FIG. 4. With reference to FIG. 4 and FIG. 7, fuel supply piping 60 (and fuel supplied thereto) enters through outer tank wall 36, through space 38 and into inner tank wall 34.

Figure 8:
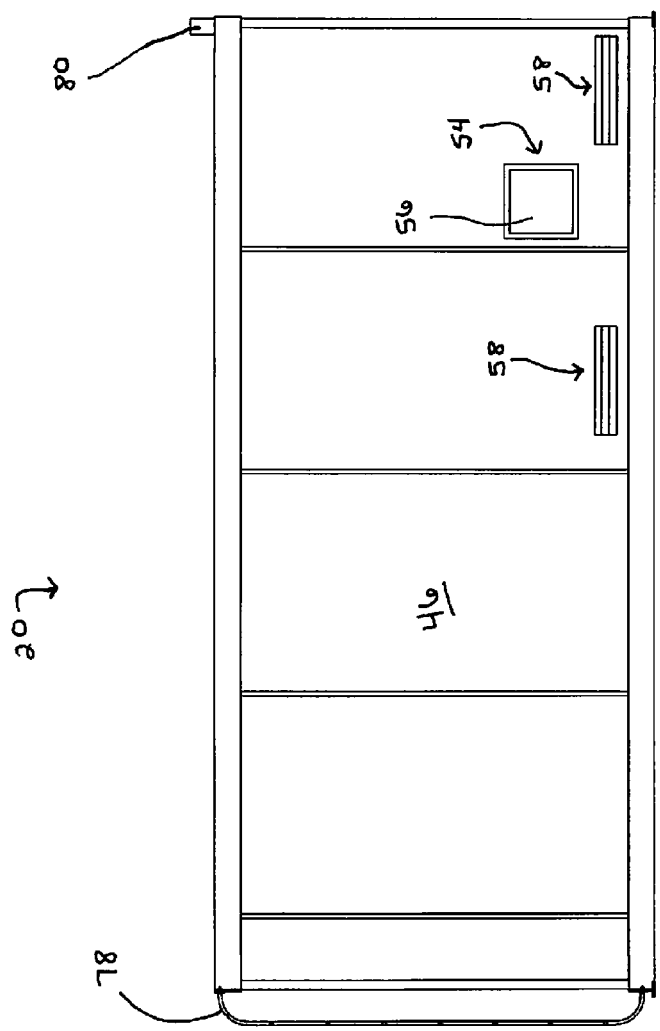
FIG. 8 is a left side view of the facility shown in FIG. 2 with portions removed for clarity.
Figure 9:
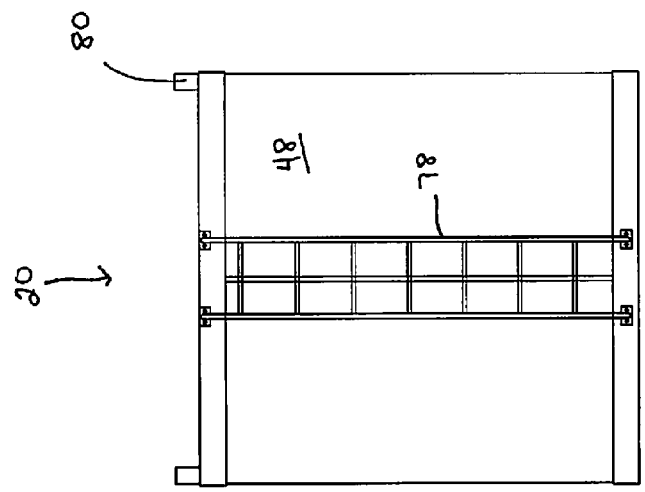
FIG. 9 is a rear view of the facility shown in FIG. 8.
Figure 10:
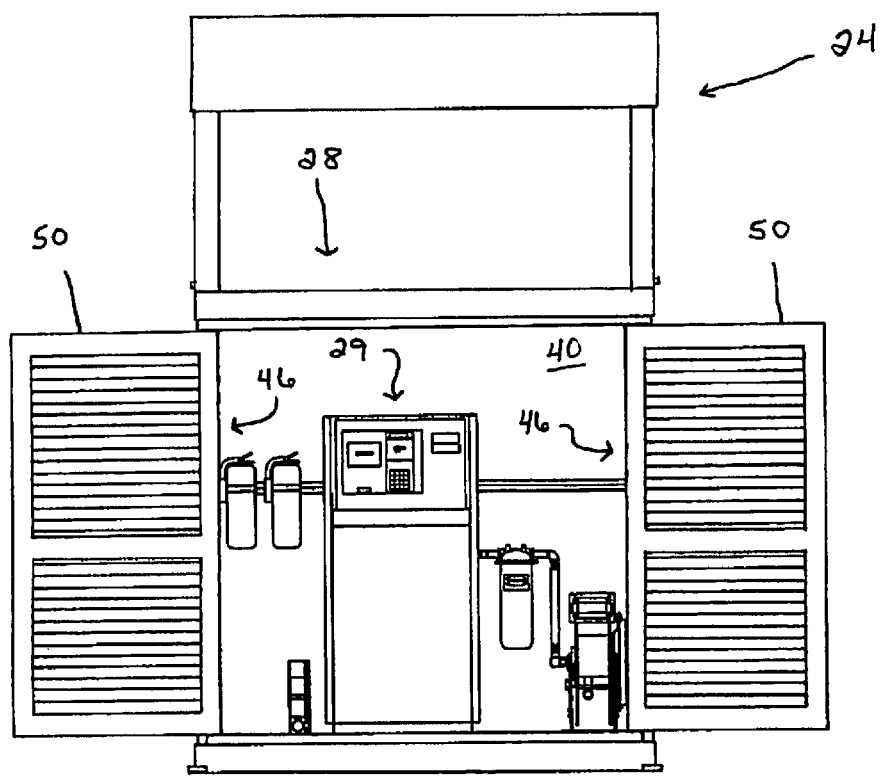
FIG. 10 is a front view of the facility shown in FIG. 1 having door feature at least partially open.

FIG. 8 is a left side view of facility 20. FIG. 9 is a rear view of facility 20. Ladder 78 provides access to the top or roof of facility. Facility 20 is configured to accept a canopy 24. Canopy mount 80 provides a mount for canopy 24. Box 22 is configured to fit within a standard shipping container and may be easily lifter. A canopy 24 may be shipped with box 22. For instance canopy 24 may be placed directly upon box 22 and together shipped as a unit. Once the parts for facility 20 arrive at a desired destination, facility 20 (with canopy 24) may be easily assembled in a single day with the help of a single or only a few assembly persons.

In one aspect the invention includes an aboveground fueling facility 20 comprising a fire rated tank 32 having an inner tank wall 34 and an outer tank wall 36 surrounded by fire rated panels 46, 48 and 40, and where panels 46, 48 operate as media panels configured to provide a background for advertising communication. In a marketing mode, fire rated media panels 46, 48 include a further layer placed upon layer 68 which has a smooth baked enamel finish (or other finish) so that facility 20 may be "wrapped" with graphic display media (i.e., a pictorial scene of a beach or other setting may be displayed, or the panels 46, 48, 48 may include a camouflage print or design, or other media).

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated. While the particular STATION HAVING PROTECTIVE WALL AND ISOLATED CHAMBER as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

What is claimed is:

1. An aboveground fueling facility comprising:
   a fuel storage section comprising a double-walled tank having a first inner tank wall and a second outer tank wall;
   a dispenser section; and
   a fuel supply chamber having piping configured to receive fuel and to supply the fuel to said double-walled tank, said fuel supply chamber isolated from said dispenser section, said fuel supply chamber positioned outside said double-walled tank, said piping positioned between said dispenser section and said double-walled tank.

2. The facility of claim 1 where said fuel supply chamber is isolated from said dispenser section by a wall spaced from said fuel storage section.

3. The facility of claim 2 where said wall is a fire wall.

4. The facility of claim 1 where said fuel supply chamber is defined in part by a fire wall, said fire wall positioned between said dispenser section and said fuel storage section.

5. The facility of claim 4 where said fire wall includes two aluminum panels separated by a plastic core.

6. The facility of claim 1 where said tank is a double-wall fire rated tank, said fuel storage section is positioned at a first end of said facility, and said dispenser section is positioned at a second end of said facility opposite said first end of said facility.

7. An aboveground fueling facility comprising:
   a fuel storage section;

a dispenser section; and a fuel supply chamber having piping configured to receive fuel and to supply the fuel to a tank within said fuel storage section, said fuel supply chamber isolated from said dispenser section and where said tank is a double-wall fire rated tank having a first inner tank wall and a second outer tank wall, said fuel storage section is positioned at a first end of said facility, and said dispenser section is positioned at a second end of said facility opposite said first end of said facility, where said fuel supply chamber is positioned between said dispenser section and said fuel storage section and said piping is positioned between said dispenser section and said tank.

8. The facility of claim 1 where fire rated panels define an exterior of said fuel storage section.

9. The facility of claim 1 where said tank is a double-walled cylindrical tank and is at least in part bounded by fire rated panels.

10. The facility of claim 9 where the fire rated panels form a box-like structure in which said tank is positioned.

11. The facility of claim 1 where said dispenser section is card operated.

12. The facility of claim 1 where said dispenser section includes double doors.

13. The facility of claim 1 where said fuel supply chamber includes an access door configured to allow a person to enter and exit said chamber.

14. The facility of claim 13 where said chamber further includes a fueling access port positioned opposite said access door, said fueling access port configured to provide access to a bottom fill nozzle to receive fuel from a refill hose.

15. The facility of claim 1 where said dispenser section includes a fire suppression system.

16. The facility of claim 1 where said fuel storage section is defined in part by fire rated panels and said dispenser section is defined in part by fire rated panels.

17. The facility of claim 16 where at least one of said fire rated panels of said fuel storage section includes a vapor vent and at least one of said fire rated panels of said dispenser section includes a vapor vent.

18. An aboveground fueling facility comprising:
a fuel storage section having a double-wall tank, said fuel storage section defined in part by fire rated exterior panels;
a dispenser section defined in part by fire rated exterior panels,
a fire wall positioned between said dispenser section and said fuel storage section, said fire wall positioned outside said fuel storage section; and
piping configured to receive fuel, said piping positioned between said firewall and said tank.

19. The facility of claim 18 where said piping is accessible through an exterior panel and configured to receive fuel to supply the fuel to said tank.

20. The facility of claim 18 further comprising an access door configured to allow a person to enter and exit a chamber defined in part by said fire wall and said tank.

21. The facility of claim 18 where said fire wall at least in part comprises a plastic core positioned between two metal panels.

22. An aboveground fueling facility comprising:
a fuel storage section including a fire resistant tank positioned at a first end of said facility;
a dispenser section positioned at a second end of said facility opposite said first end, said dispenser section includes a dispenser area bound on at least three sides by fire rated panels; and
a fuel supply chamber positioned between said fuel storage section and said dispenser section, said fuel supply chamber including an access door at a side panel of said fuel supply chamber and piping configured to receive fuel, said piping positioned between said dispenser section and said tank.

23. The facility of claim 22 further comprising a fire suppression system positioned within said dispenser section.

24. The facility of claim 22 where said fuel storage section is bound on at least three sides by fire rated panels.

25. The facility of claim 24 where said fire rated panels are configured to provide a background for advertising communication.

26. The facility of claim 22 where said access door is configured to allow a person to enter said chamber.

27. The facility of claim 26 where a further side panel is positioned opposite said access door and in part defines said chamber.

28. An aboveground fueling facility comprising:
a fuel storage section having a double-wall tank, said fuel storage section defined in part by fire rated exterior panels;
a dispenser section defined in part by fire rated exterior panels,
a fire wall positioned between said dispenser section and said fuel storage section, an access door configured to allow a person to enter and exit a chamber defined in part by said fire wall and said tank where said access door is positioned at a side panel of said facility.

29. An aboveground fueling facility comprising:
a fuel storage section having a double-wall tank having a first inner tank wall and a second outer tank wall;
a dispenser section;
a fire wall positioned between said dispenser section and said fuel storage section; and
an access door configured to allow a person to entirely enter and exit a chamber defined in part by said fire wall and said tank.

* * * * *